(12) United States Patent
Tokuhisa et al.

(10) Patent No.: US 7,339,961 B2
(45) Date of Patent: Mar. 4, 2008

(54) WAVELENGTH CONVERTING OPTICAL SYSTEM, LASER LIGHT SOURCE, EXPOSURE APPARATUS, DEVICE FOR INSPECTING OBJECT OF INSPECTION, AND POLYMER CRYSTAL WORKING APPARATUS

(75) Inventors: Akira Tokuhisa, Tokyo (JP); Yoshinori Oshita, Yoshikawa (JP)

(73) Assignee: Nikon Corporation, Tokyo (JP)

( * ) Notice: Subject to any disclaimer, the term of this patent is extended or adjusted under 35 U.S.C. 154(b) by 3 days.

(21) Appl. No.: 11/500,031

(22) Filed: Aug. 7, 2006

(65) Prior Publication Data

US 2007/0030557 A1 Feb. 8, 2007

(30) Foreign Application Priority Data

Aug. 8, 2005 (JP) ............................. 2005-230139

(51) Int. Cl.
*H01S 3/10* (2006.01)
(52) U.S. Cl. .......................................... 372/22; 372/21
(58) Field of Classification Search .................. 372/21, 372/22
See application file for complete search history.

(56) References Cited

U.S. PATENT DOCUMENTS

| 7,008,414 B2 | 3/2006 | Owa et al. | |
| 7,136,402 B1 * | 11/2006 | Ohtsuki | 372/22 |
| 2006/0039423 A1 | 2/2006 | Tokuhisa et al. | |

FOREIGN PATENT DOCUMENTS

| EP | 1 281 378 A1 | 5/2003 | |
| JP | 07-122483 A | 5/1995 | |
| JP | 09-192875 A | 7/1997 | |
| JP | 10-339891 A | 12/1998 | |
| JP | 11-015034 A | 1/1999 | |
| JP | 2001-353176 A | 12/2001 | |
| JP | 2004-061915 A | 2/2004 | |
| JP | 2004-086193 A | 3/2004 | |
| JP | WO 2005/116751 | * | 8/2005 |
| WO | WO 01/20397 A1 | 3/2001 | |
| WO | WO 2005/116751 A1 | 12/2005 | |

* cited by examiner

*Primary Examiner*—Dung Nguyen
(74) *Attorney, Agent, or Firm*—Frishauf, Holtz, Goodman & Chick, P.C.

(57) ABSTRACT

A fifth harmonic wave is formed from a fundamental wave of P polarization via a second harmonic wave forming optical element 3, a third harmonic wave forming optical element 4, and a fifth harmonic wave forming optical element 6, and a second harmonic wave of P polarization is formed from a fundamental wave of P polarization via a second harmonic wave forming optical element 9. A fundamental wave of S polarization is combined with the second harmonic wave of P polarization described above by a dichroic mirror 13; furthermore, the fifth harmonic wave of P polarization, the fundamental wave of S polarization described above and the second harmonic wave of P polarization are combined by a dichroic mirror 10, and are incident on a seventh harmonic wave forming optical element 11. A seventh harmonic wave of S polarization is formed from the fifth harmonic wave and second harmonic wave of P polarization, and is combined with the fundamental wave of S polarization by being incident on an eighth harmonic wave forming optical element 12, so that an eighth harmonic wave of P polarization is formed.

14 Claims, 9 Drawing Sheets

WAVELENGTH CONVERTING OPTICAL SYSTEM, LASER LIGHT SOURCE, EXPOSURE APPARATUS, DEVICE FOR INSPECTING OBJECT OF INSPECTION, AND POLYMER CRYSTAL WORKING APPARATUS

TECHNICAL FIELD

The present invention relates to a wavelength converting optical system which generates an eighth harmonic wave from semiconductor laser light mainly having long wavelength (light having a frequency that is n times that of the fundamental wave is referred to as an n-th harmonic wave), a laser light source using this optical system, and an exposure apparatus, device for inspecting an object of inspection, and polymer crystal working apparatus utilizing this laser light source.

BACKGROUND ART

In recent years, laser light has been used in various applications; for example, laser light has been used in the cutting and working of metals, and as a light source in photolithographic devices used in semiconductor manufacturing apparatuses. Furthermore, laser light has been used in various types of measuring instruments, and in operations and treatment devices used in surgery, ophthalmology, dentistry, and the like.

However, in the case of ArF excimer laser oscillators, the oscillators are constructed with argon gas, fluorine gas, neon gas, and the like sealed inside the chamber, and these gases must be tightly sealed. Furthermore, since these respective gases must also be loaded into the apparatus and recovered, there is a problem in that the apparatus tends to become large in size and complicated. Furthermore, in order to maintain a specified laser light generating performance in an ArF excimer laser oscillator, the internal gases must be periodically replaced, or the apparatus must be periodically overhauled.

Accordingly, it is desirable to use a solid-state laser as a laser light source instead of such an excimer laser. However, the wavelength of the laser light that is emitted from a solid-state laser ranges from the visible region to the infrared region; therefore, this wavelength is too long to be suitable for use, for example, in an inspection device. Accordingly, a method has been developed in which long-wavelength light emitted from such a solid-state laser is used after being converted into short-wavelength ultraviolet light (e.g., an eighth harmonic wave) using a non-linear optical crystal. For example, such a method is described in Japanese Patent Application Laid-Open No. 2001-353176 (Patent Reference 1).

Figure 9:
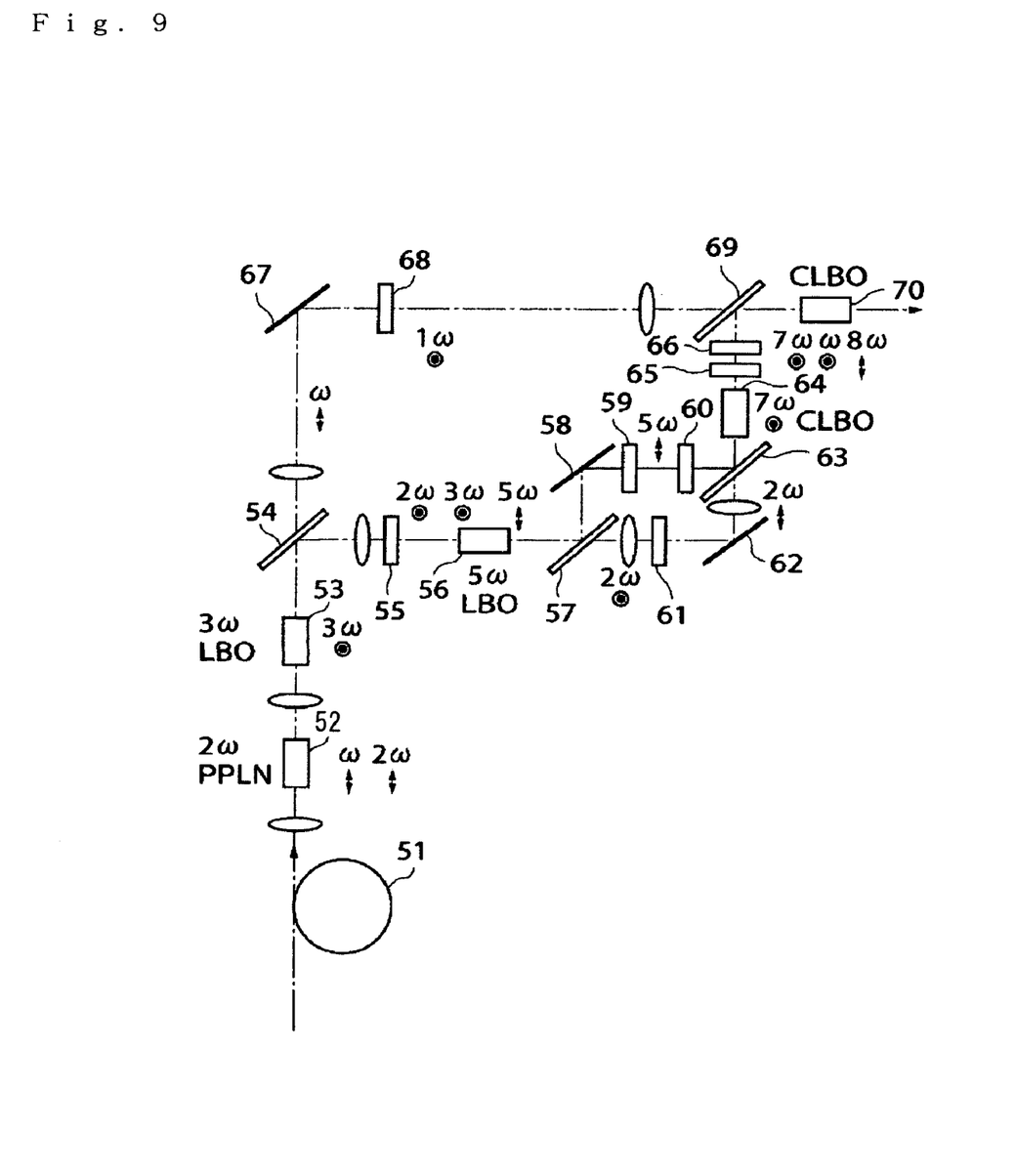
FIG. 9 is a diagram showing an outline of the optical system of a conventional laser apparatus.

An outline of the optical system of such a laser apparatus is shown in FIG. 9. In this figure, the objects indicated by oval shapes are collimator lenses and focusing lenses; a description of these lenses is omitted. Furthermore, P polarization is indicated by an arrow symbol, S polarization is indicated by symbols showing a dot inside a circle, the fundamental wave is indicated by $\omega$, and the n-th harmonic wave is indicated by $n\omega$.

In this example, fundamental light (wavelength: 1547 nm) emitted from a DFB laser (not shown in the figure) is amplified by an erbium doped fiber amplifier (EDFA) 51 and converted into P polarization, and is then incident on a second harmonic wave forming optical element (PPLN crystal) 52. A second harmonic wave of P polarization is generated and output from the second harmonic wave forming optical element 52 along with the fundamental wave.

This fundamental wave and second harmonic wave are incident on a third harmonic wave forming optical element (LBO crystal) 53. A third harmonic wave of S polarization is generated and output from the third harmonic wave forming optical element 53 along with the fundamental and second harmonic waves. This light passes through a dichroic mirror 54 and separate into the fundamental wave and the second/third harmonic waves. The separated second harmonic wave/third harmonic wave passes through a 2-wavelength wave plate 55; in this case, the second harmonic wave is converted into S polarization. Both the second harmonic wave converted into S polarization and the third harmonic wave are incident on a fifth harmonic wave forming optical element (LBO crystal) 56. A fifth harmonic wave of P polarization is generated and output from the fifth harmonic wave forming optical element 56 along with the second harmonic and third harmonic waves.

The second harmonic wave, third harmonic wave and fifth harmonic wave pass through a dichroic mirror 57, so that the second harmonic wave and fifth harmonic wave are separated. The separated fifth harmonic wave is reflected by a mirror 58, and is subjected to beam shaping by cylindrical lenses 59 and 60. Generally, because of walk-off, the fifth harmonic wave generated in the fifth harmonic wave forming optical element 56 has an elliptical cross-sectional shape, so that the focusing characteristics are poor "as is," and the wave cannot be used in the next wavelength conversion. Accordingly, this elliptical cross-sectional shape is shaped into a circular shape by the cylindrical lenses 59 and 60.

The second harmonic wave separated by the dichroic mirror 57 is converted into P polarization by passing through a ½-wave plate 61, and is reflected by a mirror 62. This light is then placed on the same optical path as the fifth harmonic wave by a dichroic mirror 63. The dichroic mirror 63 allows the second harmonic wave to pass through and reflects the fifth harmonic wave. The second and fifth harmonic waves are incident on a seventh harmonic wave forming optical element (CLBO crystal) 64. A seventh harmonic wave of S polarization is generated and output from the seventh harmonic wave forming optical element 64 along with the second and fifth harmonic waves. Because of walk-off, this seventh harmonic wave also has an elliptical cross-sectional shape, and therefore has poor focusing characteristics "as is," so that this wave cannot be used in the next wavelength conversion. Accordingly, this elliptical cross-sectional shape is shaped into a circular shape by means of cylindrical lenses 65 and 66.

Meanwhile, the fundamental wave separated by the dichroic mirror 54 is reflected by a mirror 67, and is converted into S polarization by passing through a ½-wave plate 68. This light is then placed on the same optical path as the seventh harmonic wave by a dichroic mirror 69. The dichroic mirror 69 allows the fundamental wave to pass through and reflects the seventh harmonic wave. The fundamental and seventh harmonic waves are incident on an eighth harmonic wave forming optical element (CLBO crystal) 70. An eighth harmonic wave of P polarization is generated and output from the eighth harmonic wave forming optical element 70 along with the fundamental and seventh harmonic waves.

However, in the optical system shown in FIG. 9, the following problems arise: namely, the optical elements that are used are numerous and complicated; furthermore, the dichroic mirror 69 used to combine the fundamental wave and seventh harmonic wave is required. When the wavelength of the eighth harmonic wave is 193 nm, the wavelength of the seventh harmonic wave is 221 nm. For such deep ultraviolet light, dichroic mirrors generally show problems in terms of durability. Moreover, an adjustment is needed to superimpose the fundamental and seventh harmonic waves by means of the dichroic mirror 69, which is difficult.

DISCLOSURE OF THE INVENTION

The present invention was devised in light of such circumstances; it is an object of the present invention to provide a wavelength converting optical system which can form an eighth harmonic wave in an optical system that is simpler than a conventional optical system, a wavelength converting optical system which also eliminates the need for superimposition of the fundamental wave and seventh harmonic wave, a laser light source using these wavelength converting optical systems, and an exposure apparatus, mask inspection device and polymer crystal working apparatus using this laser light source.

The first means used to solve the problems described above is a wavelength converting optical system comprising a first wavelength converting optical system which forms a fifth harmonic wave from a first fundamental wave via at least one wavelength converting optical element, a second harmonic wave forming optical element which forms a second harmonic wave from a second fundamental wave, a first optical member which combines a third fundamental wave and the second harmonic wave emitted from the second harmonic wave forming optical element on the same optical path, a second optical member which combines the third fundamental wave, the second harmonic wave emitted from the second harmonic wave forming optical element, and the fifth harmonic wave emitted from the first wavelength converting optical system on the same optical path, a seventh harmonic wave forming optical element which forms a seventh harmonic wave from the second harmonic wave and the fifth harmonic wave, and an eighth harmonic wave forming optical element which forms an eighth harmonic wave from the third fundamental wave and the seventh harmonic wave emitted from the seventh harmonic wave forming optical element.

The second means used to solve the problems described above is a wavelength converting optical system comprising a first second harmonic wave forming optical element which forms a first second harmonic wave from a first fundamental wave, a third harmonic wave forming optical element which forms a third harmonic wave from the first fundamental wave and the second harmonic wave emitted from the first second harmonic wave forming optical element, a fifth harmonic wave forming optical element which forms a fifth harmonic wave from the second harmonic wave and the third harmonic wave emitted from the third harmonic wave forming optical element, a 'second' second harmonic wave forming optical element which forms a 'second' second harmonic wave from a second fundamental wave, a first optical member which combines a third fundamental wave and the 'second' second harmonic wave emitted from the 'second' second harmonic wave forming optical element on the same optical path, a second optical member which combines the third fundamental wave, the 'second' second harmonic wave emitted from the 'second' second harmonic wave forming optical element, and the fifth harmonic wave emitted from the fifth harmonic wave forming optical element on the same optical path, a seventh harmonic wave forming optical element which forms a seventh harmonic wave from the 'second' second harmonic wave and the fifth harmonic wave, and an eighth harmonic wave forming optical element which forms an eighth harmonic wave from the third fundamental wave and the seventh harmonic wave emitted from the seventh harmonic wave forming optical element.

The third means used to solve the problems described above is the first or second means, wherein the conversion efficiency from the second fundamental wave to the 'second' second harmonic wave in the 'second' second harmonic wave forming element is 60% or greater.

The fourth means used to solve the problems described above is any of the first through third means, wherein the pulse width of the first fundamental wave through third fundamental wave is 50 ps or less.

The fifth means used to solve the problems described above is any of the first through third means, wherein there is no focusing optical system between the seventh harmonic wave forming optical element and the eighth harmonic wave forming optical element.

The sixth means used to solve the problems described above is a laser light source comprising at least one laser light source generating the first fundamental wave through the third fundamental wave, a plurality of optical fiber amplifiers which respectively amplify the first fundamental wave through third fundamental wave, a plurality of delay devices which control the timing at which at least two fundamental waves among the first fundamental wave through third fundamental wave are incident on the respective optical fiber amplifiers, and the wavelength converting optical system according to any of the first through fifth means.

The seventh means used to solve the problems described above is an exposure apparatus which is constructed so that this exposure apparatus comprises the laser light source according to the sixth means, a mask supporting part which holds a photo-mask on which a specified exposure pattern is formed, an object holding part which holds the object of exposure, an illumination optical system which illuminates the photo-mask held by the mask supporting part with ultraviolet light emitted from the laser light source, and a projection optical system which illuminates the object of exposure held by the object holding part with illuminating light that is caused to illuminate the photo-mask via the illumination optical system and that passes through this photo-mask.

The eighth means used to solve the problems described above is a device for inspecting an object of inspection, comprising the laser light source according to the sixth means, a supporting part which holds the object of inspection, a detector which detects a projected image of the object of inspection, an illumination optical system which illuminates the object of inspection held by the supporting part with ultraviolet light emitted from the laser light source, and a projection optical system which projects onto the detector illuminating light that has been caused to illuminate the object of inspection via the illumination optical system and that has passed through this object of inspection.

The ninth means used to solve the problems described above is a polymer crystal working apparatus comprising the laser light source according to the sixth means, an optical system which conducts laser light emitted from this laser light source to a polymer crystal that constitutes the object of working, and focuses this light on the portion of this polymer crystal that is being worked, and a mechanism which varies the relative positions of the optical system and the polymer crystal.

BEST MODE FOR CARRYING OUT THE INVENTION

Figure 1:
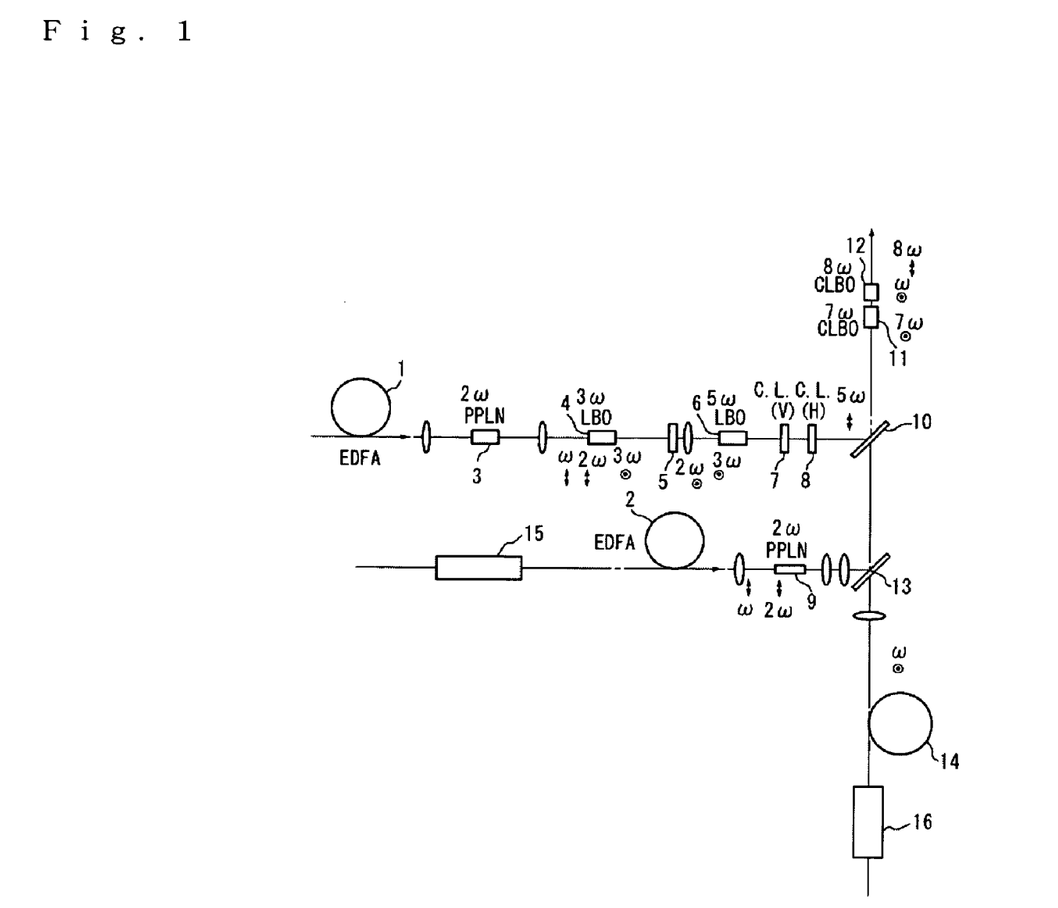
FIG. 1 is a diagram showing an outline of the optical system of a laser apparatus constituting a first working configuration of the present invention.
Figure 4:
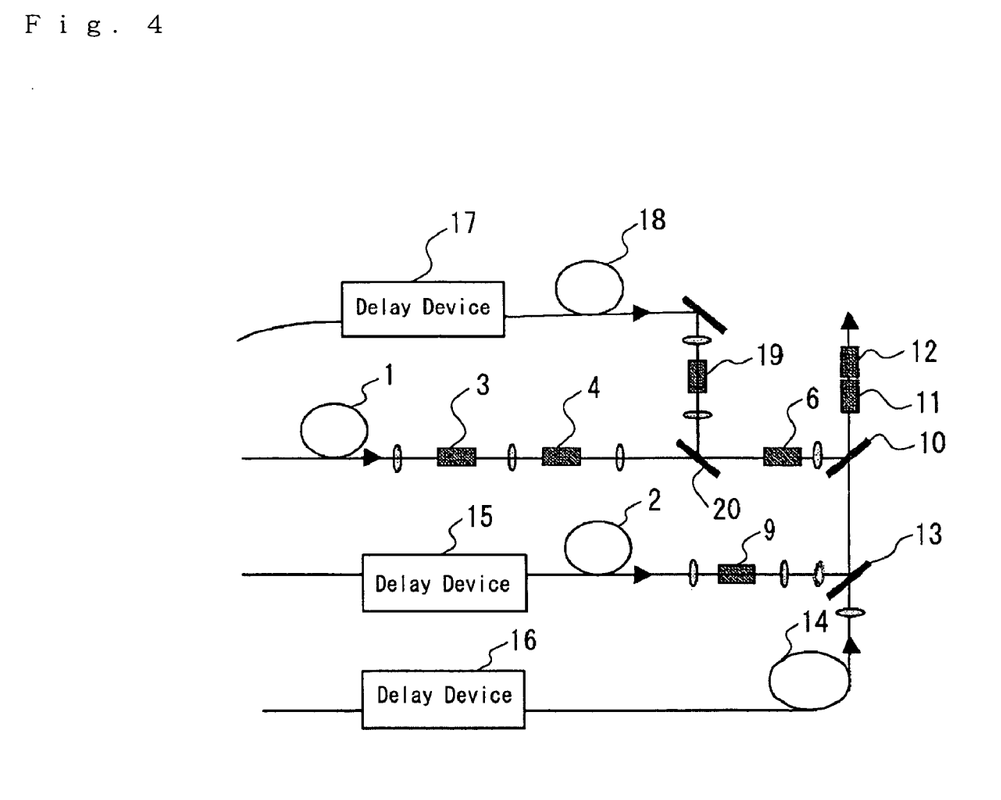
FIG. 4 is a diagram showing an outline of the optical system of a laser apparatus constituting a second working configuration of the present invention.

Working configurations of the present invention will be described below with reference to the figures. FIG. 1 is a diagram showing an outline of the optical system of a laser apparatus constituting a first working configuration of the present invention. In FIGS. 1 and 4, the objects indicated by oval shapes are collimator lenses and focusing lenses; an explanation of these lenses is omitted. Furthermore, P polarization is indicated by an arrow symbol, S polarization is indicated by symbols showing a dot inside a circle, the fundamental wave is indicated by ω, and n-th waves are indicated by nω.

In this working configuration, the fundamental wave (wavelength: 1547 nm) emitted from a single DFB laser (not shown in the figures) branches into three waves, which are respectively amplified by a first EDFA 1, second EDFA 2, and third EDFA 14. However, it would also be possible to amplify fundamental waves emitted from three DFB lasers by means of respective EDFAs. As is shown in FIG. 1, the fundamental wave of P polarization amplified by the first EDFA 1 is caused to be incident on the first second harmonic wave forming optical element (PPLN crystal) 3, and a second harmonic wave of P polarization is generated and output from the first second harmonic wave forming optical element 3 along with the fundamental wave. This second harmonic wave and fundamental wave are incident on the third harmonic wave forming optical element (LBO crystal) 4. A third harmonic wave of S polarization is generated and output from the third harmonic wave forming optical element 4 along with the fundamental and second harmonic waves. Furthermore, the second harmonic wave forming optical element 3 is not limited to a PPLN crystal; it would also be possible to use a PPKTP crystal, PPSLT crystal, LBO crystal, or the like.

As a result of these light beams being passed through the 2-wavelength wave plate 5, only the second harmonic wave is converted into S polarization. For example, a wave plate consisting of a flat plate of a uniaxial crystal that is cut parallel to the optical axis of the crystal can be used as the 2-wavelength wave plate. The thickness of the wave plate (crystal) is cut at an integral multiple of λ/2 with respect to the light of one wavelength, and is cut at an integral multiple of λ with respect to the light of the other wavelength, so that the polarization is rotated with respect to the light of one wavelength (second harmonic wave), and so that the polarization is not rotated with respect to the light of the other wavelength. Moreover, both the second harmonic wave and third harmonic wave that have been converted into S polarization are caused to be incident on the fifth harmonic wave forming optical element (LBO crystal) 6. A fifth harmonic wave of P polarization is generated and output from the fifth harmonic wave forming optical element 6 along with the second and third harmonic waves. Furthermore, the fundamental wave of P polarization passes through the fifth harmonic wave forming optical element 6 "as is."

The fifth harmonic wave generated in the fifth harmonic wave forming optical element 6 has an elliptical cross-sectional shape because of walk-off; accordingly, this wave has poor focusing characteristics "as is," and cannot be used in the next wavelength conversion. Consequently, this elliptical cross-sectional shape is shaped into a circular shape by the cylindrical lenses 7 and 8. Furthermore, a BBO crystal or CBO crystal may also be used as the fifth harmonic wave forming optical element 6.

Meanwhile, the fundamental wave of P polarization amplified by the second EDFA 2 is incident on the 'second' second harmonic wave forming optical element (PPLN crystal) 9, and a second harmonic wave of P polarization is generated and output from the 'second' second harmonic wave forming optical element 9 along with the fundamental wave . Furthermore, it would also be possible to use a PPKTP crystal, PPSLT crystal, LBO crystal, or the like, instead of a PPLN crystal. Moreover, it is desirable to select a second harmonic wave forming optical element which is such that the amount of conversion from the fundamental wave to the second harmonic wave is as large as possible, and it is desirable that the conversion efficiency from the fundamental wave to the second harmonic wave be 60% or greater.

In addition, the fundamental wave of S polarization amplified by the third EDFA 14 is combined with the second harmonic wave of P polarization mentioned above by the dichroic mirror 13. In this example, the dichroic mirror 13 is a mirror that allows the fundamental wave to pass through, and that reflects the second harmonic wave. The combined fundamental wave of S polarization and second harmonic wave of P polarization are combined with the fifth harmonic wave of P polarization described above by the dichroic mirror 10. In this example, the dichroic mirror 10 is a mirror that allows the fundamental wave and second harmonic wave to pass through, and that reflects the fifth harmonic wave. It would be possible to use a bulk type optical element for this synthesis of light; for example, a color decomposing/synthesizing mirror (dichroic mirror), or to use a reflective type or transmitting type diffraction optical element.

The combined fundamental wave of S polarization, second harmonic wave of P polarization and fifth harmonic wave of P polarization are incident on the seventh harmonic wave forming optical element (CLBO crystal) 11, and a seventh harmonic wave of S polarization is generated and output from the seventh harmonic wave forming optical element 11 along with these incident light beams. These light beams are incident on the eighth harmonic wave forming optical element (CLBO crystal) 12. Here, the fundamental wave of S polarization and the seventh harmonic wave of S polarization are combined, so that an eighth harmonic wave of P polarization is generated. In cases where it is desired to separate only the eighth harmonic wave from the light of other wavelengths emitted from the eighth harmonic wave forming optical element 12, these respective light beams can be separated by using a dichroic mirror, polarized beam splitter, or prism.

First, let us describe the characterizing features of the present working configuration qualitatively. The conversion efficiency from the fifth harmonic wave to the seventh harmonic wave can be increased by supplying a second harmonic wave (used for seventh harmonic wave formation) with a peak power as high as possible, which can be obtained using the fundamental wave amplified by the second EDFA 2. Thus, a seventh harmonic wave with a higher peak power can be generated. Moreover, it is possible to form an eighth harmonic wave with a higher peak power by supplying the fundamental wave amplified by the third EDFA 14 since the fundamental wave has a peak power which is sufficiently high to increase the conversion efficiency from the seventh harmonic wave to the eighth harmonic wave.

It is also possible to supply the fundamental and the second harmonic waves, used for eighth and seventh wave formation respectively, from the fundamental wave amplified by the second EDFA 2. In this case, however, it is necessary to balance the fundamental and the second harmonic waves, and it is not possible to supply a second harmonic wave that is sufficient for raising the conversion efficiency from the fifth harmonic wave to the seventh harmonic wave.

Figure 2:
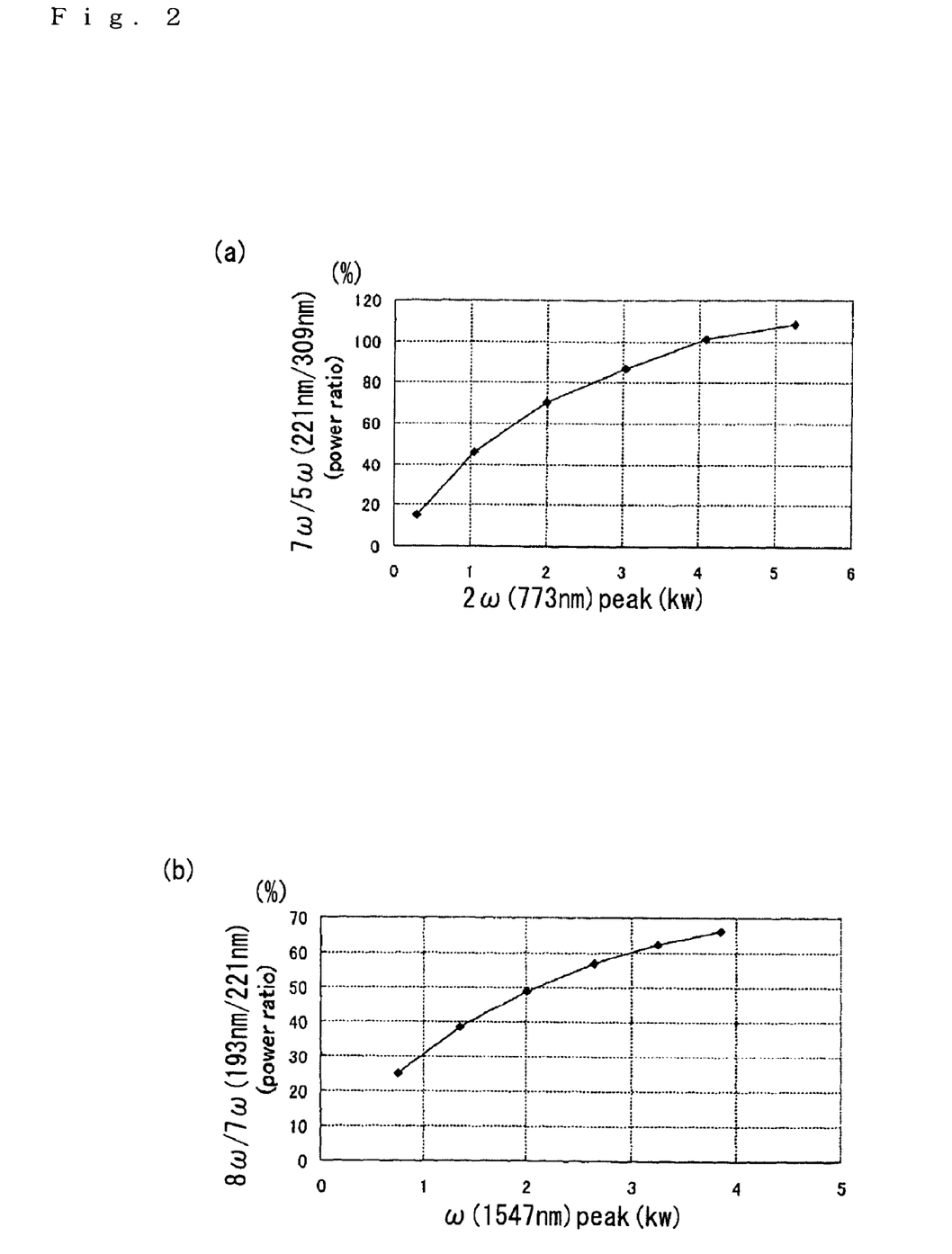
FIG. 2(a) is graph showing the conversion efficiency from the fifth harmonic wave to the seventh harmonic wave plotted against the peak power of the second harmonic wave in the first working configuration.
FIG. 2(b) is a graph showing the conversion efficiency from the seventh harmonic wave to the eighth harmonic wave plotted against the peak power of the fundamental wave.

This will be described quantitatively using FIG. 2. FIG. 2(a) shows the conversion efficiency from the fifth harmonic wave to the seventh harmonic wave plotted against the peak power of the second harmonic wave in the first working configuration. FIG. 2(b) is shows the conversion efficiency from the seventh harmonic wave to the eighth harmonic wave plotted against the peak power of the fundamental wave in the first working configuration. For example, by using a fundamental wave with a peak power of 5 kW supplied by the second EDFA 2 and maximizing the conversion efficiency, a second harmonic wave with a peak power of approximately 4 kW (conversion efficiency: approximately 80%) can be obtained.

Meanwhile, consider a case where the fundamental and the second harmonic waves, used for eighth and seventh harmonic wave generation respectively, are supplied by the output of the second EDFA 2 which has a peak power of 5 kW. The peak power of the second harmonic wave used for seventh harmonic wave formation is adjusted to be, for example, 2.5 kW corresponding to the conversion efficiency of 50% (considering the balance with the fundamental wave used for eighth harmonic wave formation). As shown in FIG. 2, for a fifth harmonic wave of approximately 0.69 kW, the conversion efficiency from the fifth harmonic wave to the seventh harmonic wave is approximately 77% when the peak power of the second harmonic wave is 2.5 kW. However, when the peak power of the second harmonic wave is 4 kW, the conversion efficiency is approximately 100%. Although the conversion efficiency also depends on the output power of the fifth harmonic wave, this tendency is substantially the same. Here, the conversion efficiency is defined as the seventh harmonic wave output with respect to the fifth harmonic wave output.

Furthermore, for a seventh harmonic wave of approximately 0.6 kW, the conversion efficiency from the seventh harmonic wave to the eighth harmonic wave is approximately 55% when the peak power of the fundamental wave is 2.5 kW. On the other hand, when the fundamental wave is approximately 5 kW, the conversion efficiency is approximately 70% (the extrapolated value). Although the conversion efficiency also depends on the output of the seventh harmonic wave, this tendency is substantially the same. Here, the conversion efficiency is defined as the eighth harmonic wave output with respect to the seventh harmonic wave output.

When the fundamental and the second harmonic waves (for eighth and seventh harmonic waves generation respectively) are supplied by a single EDFA (i.e. EDFA 2), it is necessary to raise the gain of the EDFA to achieve the same level of peak powers for the fundamental and second harmonic waves as in the case where they are supplied by two independent amplifiers (i.e., EDFA 14 and EDFA 2 respectively). In this case, the spectral width of the fundamental wave is broadened by the nonlinear effects in the EDFA. Consequently, the spectral width of the eighth harmonic wave is also broadened. Furthermore, the temporal and spatial shape of the fundamental wave that passes through the second harmonic wave forming optical element is deformed (i.e., the peak power drops), so that the conversion efficiency drops compared to that achieved by the fresh fundamental wave.

Moreover, in the present working configuration, the fundamental and the second harmonic waves, used for eighth and seventh harmonic wave formation respectively, can be separately adjusted with regard to the optical axes of these waves. Accordingly, the effects of walk-off generated by the birefringence of the seventh harmonic wave forming optical element can be compensated, enabling ideal optical axis adjustments. Furthermore, the beam waists of the fundamental wave and of the second harmonic wave can be separately adjusted to the optimal positions. As a result, high conversion efficiencies and stability can be achieved.

The present working configuration is also useful for increasing the output. In the seventh and eighth harmonic wave forming optical elements, problems such as phase mismatching caused by the heating of the beam path, damage, and the like occur as the average output power per unit area of the ultraviolet light (seventh and eighth harmonic waves) increases. Accordingly, it is desirable to decrease the optical power density (average output power per unit area) of the seventh and eighth harmonic waves. Correspondingly it is necessary to enlarge the beam diameters of the fundamental, the second and the fifth harmonic waves used for eighth and seventh harmonic wave generation.

However, if the power densities of the fundamental and the second harmonic waves, used for eighth and seventh harmonic wave generation respectively, are lowered, the conversion efficiency from the fifth harmonic wave to the seventh harmonic wave and that from the seventh harmonic wave to the eighth harmonic wave drop (the conversion efficiency depends on the power density of the fundamental wave and the second harmonic wave).

In the working configuration, the second harmonic wave used for seventh harmonic wave formation is supplied from the fundamental wave amplified by the second EDFA 2, and the fundamental wave used for eighth harmonic wave formation is supplied by the third EDFA 14. Accordingly, compared to the case in which both the fundamental wave and the second harmonic wave are supplied from the fundamental wave amplified by the second EDFA 2, it is possible to supply the fundamental and the second harmonic waves with higher average powers. As a result, even if the beam diameters of the fundamental wave and of the second harmonic wave (and of the fifth harmonic wave, correspondingly) are expanded, it is possible to keep the power density of the fundamental wave and the harmonic waves high enough to ensure a considerable conversion efficiency, while at the same time, the average power per unit area of the seventh and eighth harmonic waves can be lowered. Thus, the mean output power of ultraviolet light per unit area can be lowered without lowering the conversion efficiency, so that a higher output power can be obtained while solving the problems described above.

Figure 3:
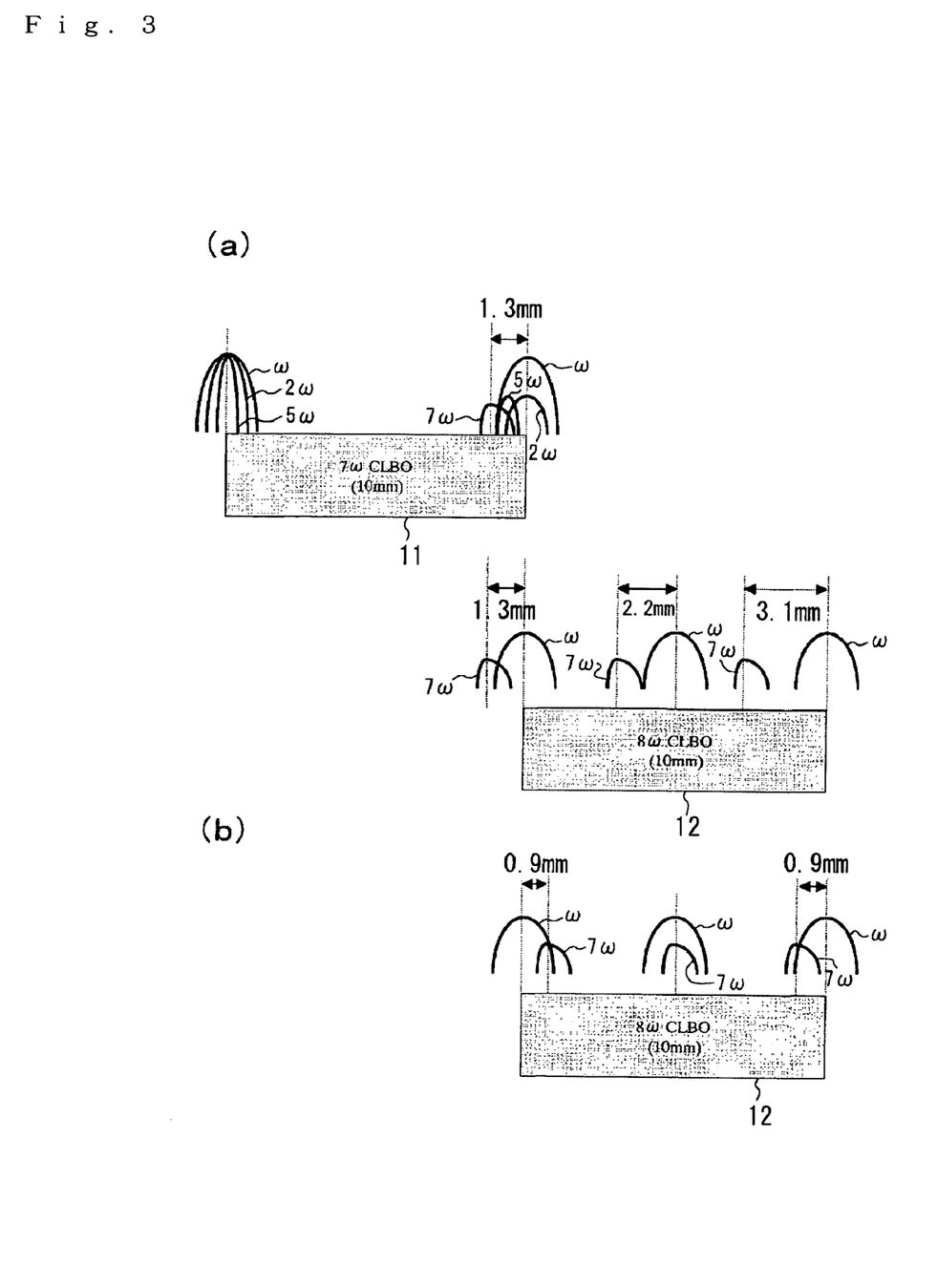
FIG. 3 is a diagram showing the state in which the fundamental wave, second harmonic wave, fifth harmonic wave and seventh harmonic wave pass through the seventh harmonic wave forming optical element and eighth harmonic wave forming optical element when the pulse width of the fundamental wave is 10 ps.

Another characterizing feature of the present working configuration is that it is used in cases where the pulse width of the fundamental wave is relatively short. Let us consider a case in which the pulse width of the fundamental wave is approximately 10 ps (pulse interval is, for example, 10 ns). Let us assume that the fundamental and the second harmonic waves, used for eighth and seventh harmonic wave generation respectively, originate from a fundamental wave amplified by a single EDFA. Then, it may be assumed that the fundamental, the second harmonic and the fifth harmonic waves reach the seventh harmonic wave forming optical element 11 as shown in FIG. 3(*a*). FIG. 3(*a*) shows how these harmonic waves, as well as the generated seventh and eighth harmonic waves, propagate through the seventh and eighth harmonic wave forming optical elements when the pulse width of the fundamental wave is 10 ps.

In cases where a fundamental wave with a pulse width of approximately 10 ps (pulse interval: 10 ns) cannot be produced by a DFB laser and EOM, a mode-locked laser may be used. The temporal pulse width of 10 ps corresponds to the spatial pulse width of approximately 1.9 mm, and in general the pulse width becomes shorter as the wavelength of the harmonic wave decreases.

The second and fifth harmonic waves generate the seventh harmonic wave propagating through the seventh harmonic wave forming optical element 11. Since the velocity of light inside the optical element 11 is slower for shorter wavelengths than for longer wavelengths, the fundamental, the second, the fifth, and the seventh harmonic waves propagate as shown in FIG. 3(*a*). As a result, at the exit surface of the seventh harmonic wave forming optical element 11, the position of the seventh harmonic wave is delayed by approximately 1.3 mm from that of the fundamental wave.

During the propagation through the eighth harmonic wave forming optical element 12 (with a length of 10 mm) that is installed adjacent to the seventh harmonic wave forming optical element 11, the delay of the seventh harmonic wave with respect to the fundamental wave is further increased to about 2.2 mm in at the center, and to 3.1 mm at the emission end. Thus there is almost no overlapping of the two beams in the eighth harmonic wave forming optical element 12, and the generation of the eighth harmonic wave decreases conspicuously.

In the working configuration of the present invention, on the other hand, the fundamental wave used for eighth harmonic wave formation is separately generated by the third EDFA 14. Therefore, this wave can be controlled separately from the second harmonic wave used for seventh harmonic wave formation which originates from the second EDFA 2. Accordingly, by delaying the fundamental wave by a specified time, it is possible to realize sufficient overlapping of the fundamental and the seventh harmonic waves through the entire range of the optical element. Controlling the timing of the fundamental wave is accomplished by means of a second delay device 16 installed on the incident side of the third EDFA 14. The first delay device 15 controls the timing of the second harmonic wave entering the seventh harmonic wave forming optical element 11.

As shown in FIG. 3(*b*), when the fundamental wave is delayed by approximately 0.9 mm with respect to the seventh harmonic wave, it overlaps with the seventh harmonic wave at the center of the eighth harmonic wave forming optical element 12, and it is emitted from the exit surface approximately 0.9 mm ahead of the seventh harmonic wave. The way of delaying the second harmonic wave and the third fundamental wave, performed by the use of the first delay device 15 and the second delay device 16 respectively, is not limited to the one shown in FIG. 3. It is desirable to perform the control of the timing so that the conversion efficiencies in the respective optical elements show the maximum values, considering the pulse width or the like.

To ensure a considerable conversion efficiency, an optical element with a length of approximately 5 mm or greater is necessary, although the required length depends on the peak power of the fundamental wave. In this case, if the pulse width of the fundamental wave becomes approximately 50 ps or less, the problem of insufficient overlapping between the fundamental and the seventh harmonic waves arises for the eighth harmonic wave forming optical element 12. Accordingly, the construction of the working configuration is effective.

Furthermore, the combination of the polarization (P wave, S wave) of the light that is incident on the respective wavelength converting optical elements such as the second harmonic wave forming optical element is not limited to the combination shown in the first working configuration.

FIG. 4 is a diagram showing an outline of the optical system of a laser apparatus constituting a second working configuration of the present invention. A portion of the construction shown in FIG. 4 is shared with the construction shown in FIG. 1. Accordingly, the same constituent elements are labeled with the same symbols, and a description of these elements is omitted.

In FIG. 4, the optical system that generates a second harmonic wave from the fundamental wave amplified by the second EDFA 2, and the optical system that combines the fundamental wave amplified by the third EDFA 14 with the second harmonic wave, are the same as the optical systems shown in FIG. 1.

The difference between the optical systems shown in FIG. 4 and FIG. 1 is a modified optical system to generate the fifth harmonic wave, in which the second harmonic wave is generated by the 'third' second harmonic wave forming optical element 19 using the fundamental wave amplified by the fourth EDFA 18, and the third harmonic wave is generated by the third harmonic wave forming optical element 4 using the fundamental wave amplified by the EDFA 1.

The second and the third harmonic waves are combined by the dichroic mirror 20, and then fed into the fifth harmonic wave forming optical element 6. In this example, the dichroic mirror 20 reflects the second harmonic wave and allows the third harmonic wave to pass through. Furthermore, the third delay device 17 is disposed on the incident side of the fourth EDFA 18.

Figure 5:
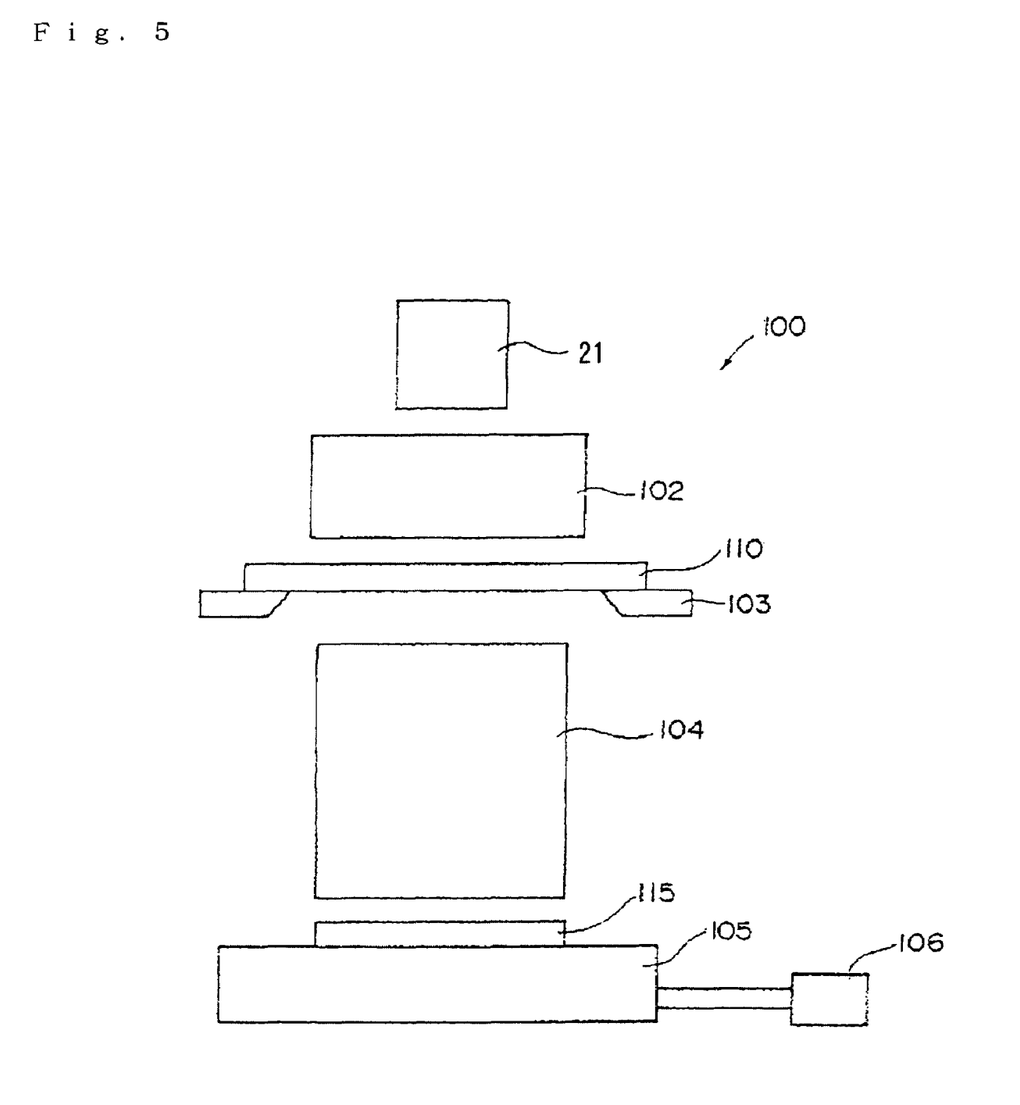
FIG. 5 is a diagram showing an outline of an exposure apparatus using a laser apparatus constituting a working configuration of the present invention.

Next, an exposure apparatus 100 which is used in a photolithographic process (one type of semiconductor manufacturing process), and which is constructed using a laser apparatus 21 constituting the working configuration of the present invention, will be described with reference to FIG. 5. The exposure apparatus used in a photolithographic process is in principle identical to that used in photoengraving. A device pattern which is finely drawn on a photo-mask (reticle) is transferred by being optically projected onto a semiconductor wafer, glass substrate, or the like which is coated with a photo-resist.

This exposure apparatus 100 is constructed so that this apparatus comprises the laser apparatus 21 described above, an illumination optical system 102, a mask supporting stand 103 which supports a photo-mask (reticle) 110, a projection optical system 104, a carrying stand 105 which carries and holds a semiconductor wafer 115 constituting the object of exposure, and a driving device 106 which causes the carrying stand 105 to move horizontally. In this exposure apparatus 100, the laser light that is output from the laser apparatus 21 is input into the illumination optical system 102 which is constructed from a plurality of lenses, and is caused to irradiate the entire surface of the photo-mask 110 supported on the mask supporting stand 103 via this optical system 102. The light that passes through the photo-mask 110 as a result of this irradiation has an image of the device pattern that is drawn on the photo-mask 110. Via the projection optical system 104, this light is caused to irradiate specified positions on the semiconductor wafer 115 that is carried on the carrying stand 105.

In this case, an image of the device pattern on the photo-mask 110 is reduced and focused as an exposing light image on the surface of the semiconductor wafer 115 by the projection optical system 104. In the case of the exposure apparatus described above, an exposure apparatus which is compact and which has good maintenance characteristics and operating characteristics can be obtained by utilizing the characteristics of an ultraviolet light source that is compact and light-weight and that has a high degree of freedom in layout.

Next, a mask defect inspection device constructed using the laser apparatus 21 of the present invention described above will be described with reference to FIG. 6. A mask defect inspection device optically projects a device pattern that is precisely drawn on a photo-mask onto a TDI sensor (time delay and integration sensor), compares the sensor image with a specified reference image, and extracts pattern defects from the differences. The mask defect inspection device 120 is constructed so that this device comprises the laser apparatus 21 described above, an illumination optical system 112, a mask supporting stand 113 that supports a photo-mask 110, a driving device 116 that moves the mask supporting stand in the horizontal direction, a projection optical system 114, and a TDI sensor 125.

Figure 6:
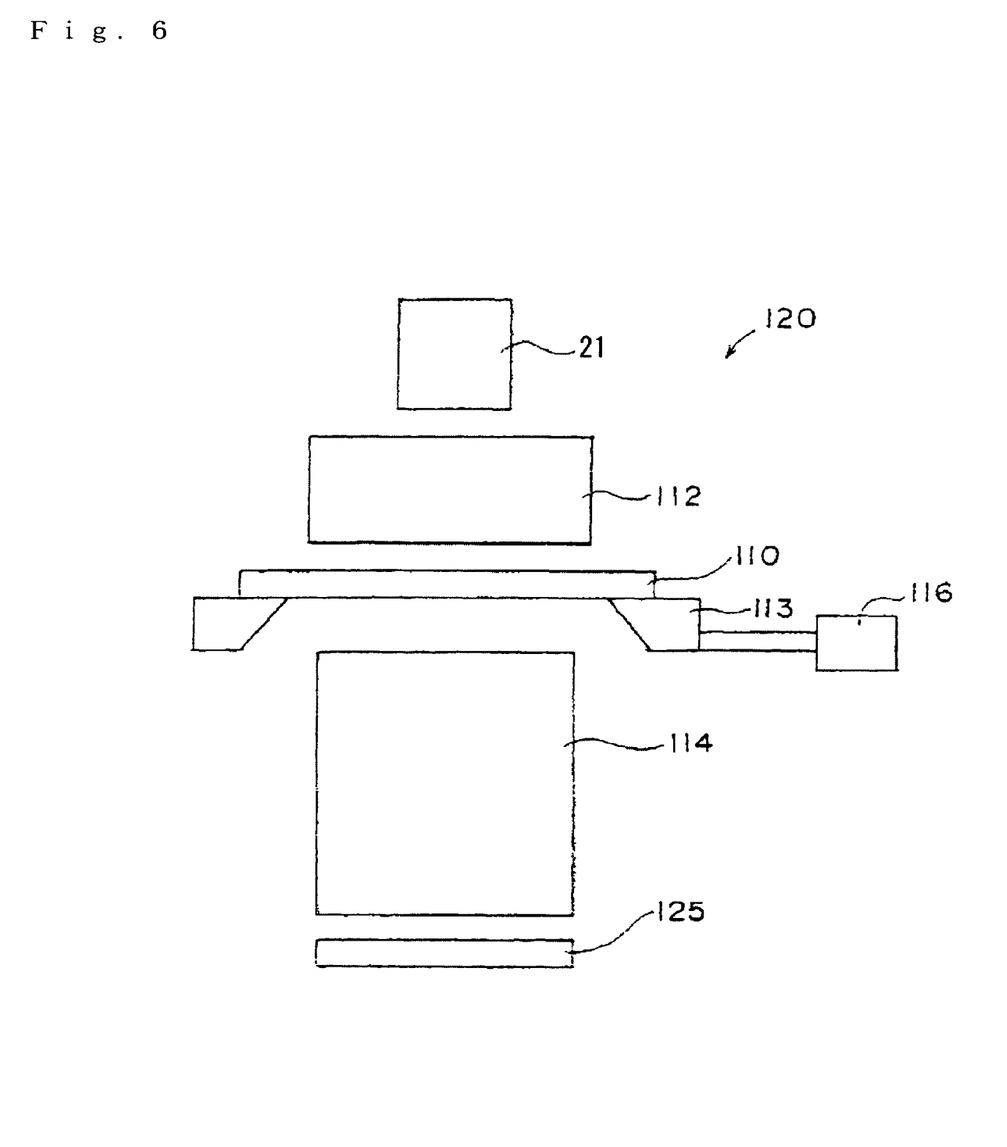
FIG. 6 is a diagram showing an outline of a mask defect inspection device using a laser apparatus constituting a working configuration of the present invention.

In this mask defect inspection device 120, the laser light that is output from the laser apparatus 21 is input into the illumination optical system 112 that is constructed from a plurality of lenses, and a specified region on the photo-mask 110 that is supported on the mask supporting stand 113 is irradiated via this optical system. The light that passes through the photo-mask 110 as a result of this irradiation has an image of the device pattern that is drawn on the photo-mask 110, and this light is focused in a specified position on the TDI sensor 125 via the projection optical system 114.

Furthermore, the horizontal movement speed of the mask supporting stand 113 and the transmission clock of the TDI sensor 125 are synchronized. The object of inspection is not limited to masks; this device can also be used to inspect wafers, liquid crystal panels, and the like.

Figure 7:
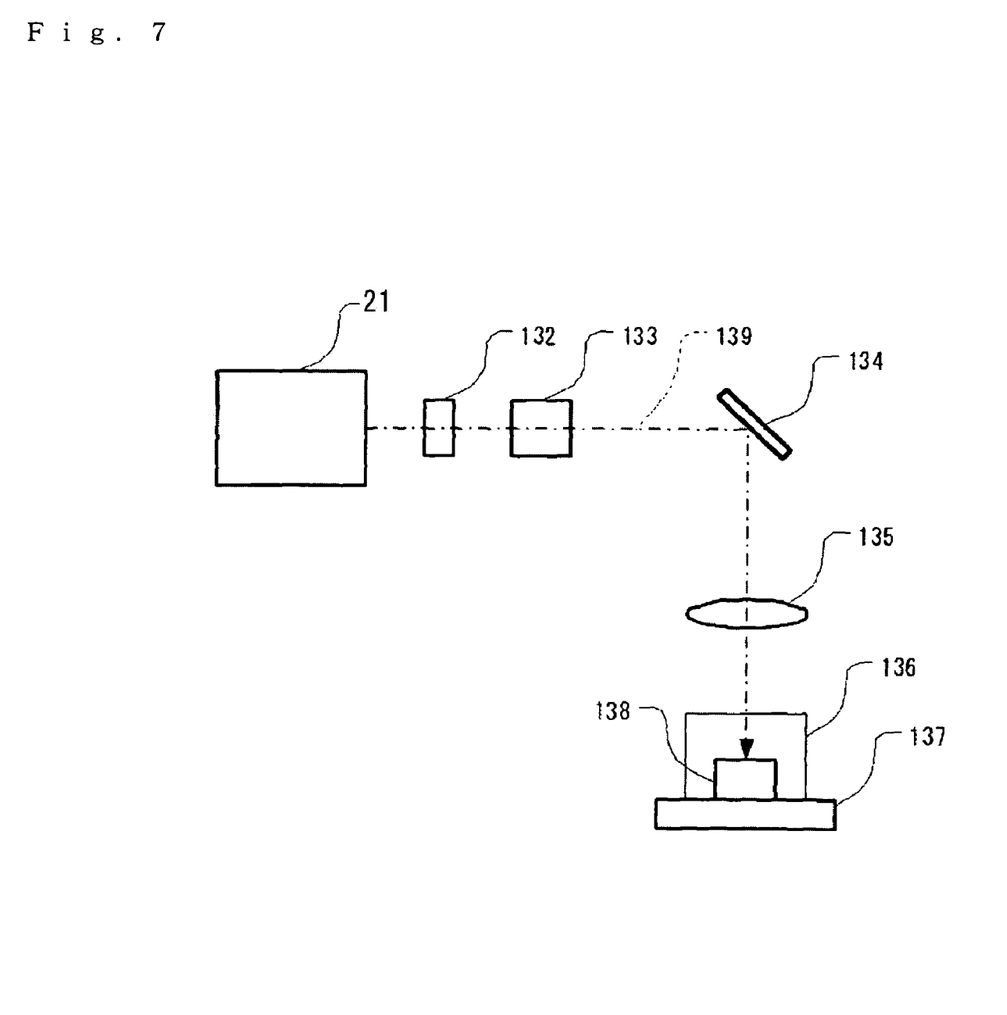
FIG. 7 is a diagram showing an outline of a polymer crystal working apparatus using a laser apparatus constituting a working configuration of the present invention.

FIG. 7 is a schematic diagram of a polymer crystal working apparatus constructed using the laser apparatus 21 of the present invention. The ultraviolet short-pulse laser light 139 emitted from the laser apparatus 21 is focused and directed onto a polymer crystal 138 placed in a sample container 136 via a shutter 132, intensity adjusting element 133, irradiation position control mechanism 134, and focusing optical system 135. The sample container 136 is carried on a stage 137, and can move in the directions of three dimensions along the x axis, y axis and z axis in an x-y-z orthogonal coordinate system with the direction of the optical axis taken as the z axis; furthermore, the container can rotate about the z axis. Working of the polymer crystal 138 is accomplished by the laser light that is focused and directed onto the surface of the polymer crystal 138.

Incidentally, in cases where an object of working consisting of a polymer crystal is worked, it is necessary to confirm the location on the object of working that is irradiated by the laser light. However, laser light is ordinarily not visible light, so that confirmation by visual inspection is impossible. Accordingly, it is desirable that this apparatus be used in combination with an optical microscope.

Figure 8:
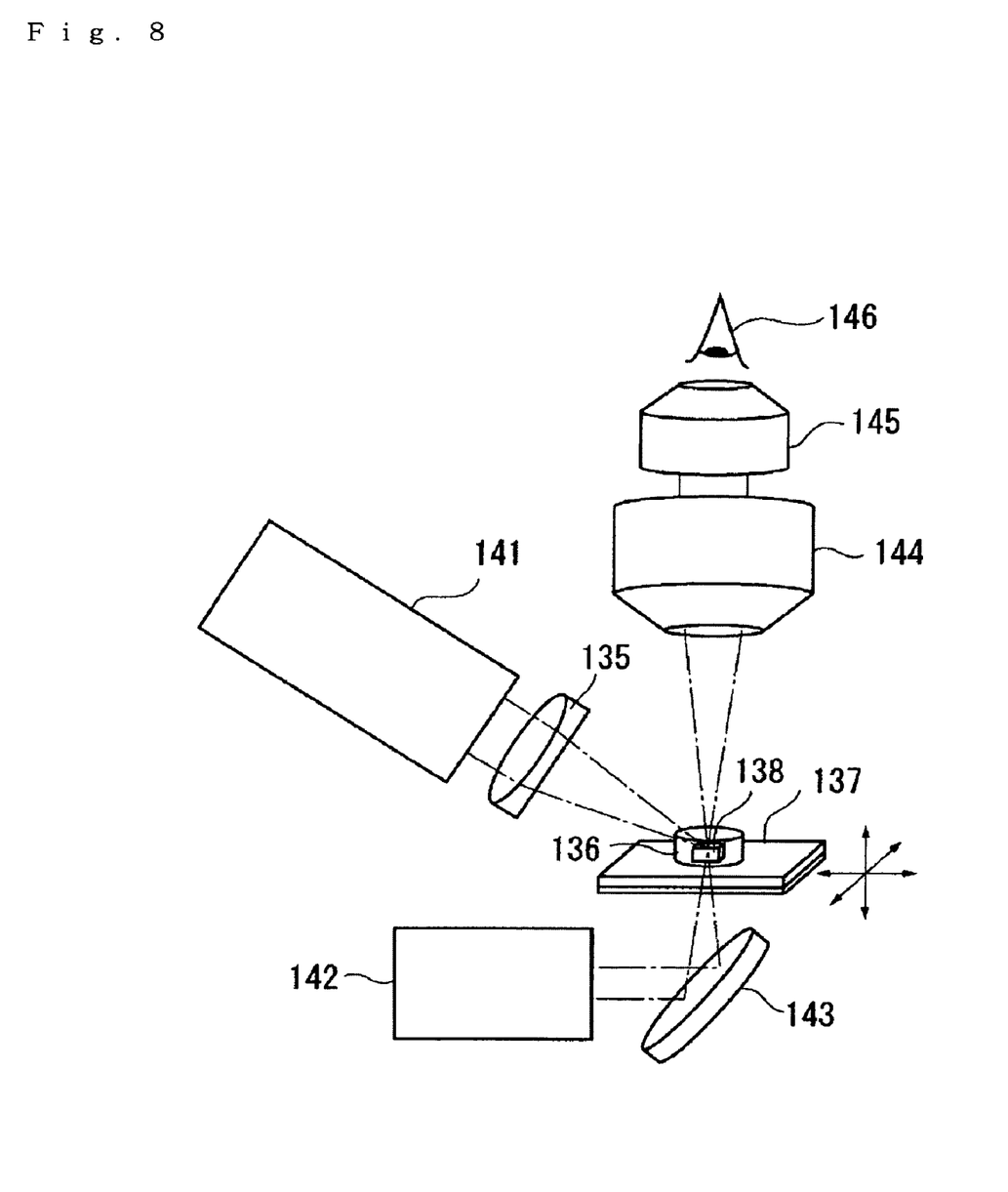
FIG. 8 is a diagram showing an example in which a polymer crystal working apparatus using a laser apparatus constituting a working configuration of the present invention is used in combination with an optical microscope.

An example is shown in FIG. 8. In the optical system shown in FIG. 8(*a*), laser light from an ultraviolet short-pulse laser system 141 (corresponding to symbols 21 and 132 through 134 in FIG. 7) is focused on a specified point via a focusing optical system 135. The stage 137 has the function described in FIG. 8; a sample container 136 containing a polymer crystal 138 is carried on the stage 137. Visible light from an illuminating light source 142 is reflected by a reflective mirror 143, and subjects the sample container 136 to Koehler illumination. The polymer crystal 138 is viewed by the eye 146 via the object lens 144 and ocular lens 145 of the optical microscope. A cruciform mark is formed in the position of the optical axis of the optical microscope, so that the optical axis position can be recognized visually.

Furthermore, the position of the focal point of the optical microscope (focus position, i.e., the plane that is in focus when viewed visually) is fixed. The laser light that is focused by the focusing optical system 135 is focused in the position of the optical axis of the optical microscope, and in the position of the focal point of the optical microscope. Accordingly, in a case where the object of working is placed on the stage 137, and an image of this object of working is observed with the optical microscope, the image is focused, and the laser light from the laser system 141 is focused in the position located at the center of the cruciform mark. Furthermore, the relative positional relationship of the laser system 141, focusing optical system 135 and optical microscope parts is fixed, so that only the stage 137 can move relative to these fixed systems.

Accordingly, by performing working while moving the stage 137 so that the location where working is to be performed is located in the optical axis position and focal position of the optical microscope, working of desired locations and working of desired shapes can be accomplished. If it is desired to perform automated working, this can be accomplished by attaching an automatic focal point adjustment device to the optical microscope, driving the stage 137 in accordance with instructions from this device, and driving the stage 137 so that a predetermined specified part of the stage 137 is on the optical axis of the optical microscope. Furthermore, after the reference position is initially aligned, the stage 137 may be driven in two dimensions or in three dimensions by a servo mechanism.

With regard to laser treatment devices using the laser apparatus of the present invention, only the laser apparatus is different; the technique described in the Patent Reference 1 mentioned above can be used "as is." Accordingly, a description is omitted.

The invention claimed is:

1. A wavelength converting optical system comprising:
a first wavelength converting optical system which forms a fifth harmonic wave from a first fundamental wave via at least one wavelength converting optical element;
a second harmonic wave forming optical element which forms a second harmonic wave from a second fundamental wave;
a first optical member which combines a third fundamental wave and the second harmonic wave emitted from the second harmonic wave forming optical element on the same optical path;
a second optical member which combines the third fundamental wave, the second harmonic wave emitted from the second harmonic wave forming optical element, and the fifth harmonic wave emitted from the first wavelength converting optical system on the same optical path;
a seventh harmonic wave forming optical element which forms a seventh harmonic wave from the second harmonic wave and the fifth harmonic wave; and
an eighth harmonic wave forming optical element which forms an eighth harmonic wave from the third fundamental wave and the seventh harmonic wave emitted from the seventh harmonic wave forming optical element.

2. A wavelength converting optical system comprising:
a first second harmonic wave forming optical element which forms a first second harmonic wave from a first fundamental wave;
a third harmonic wave forming optical element which forms a third harmonic wave from the first fundamental wave and the second harmonic wave emitted from the first second harmonic wave forming optical element;
a fifth harmonic wave forming optical element which forms a fifth harmonic wave from the second harmonic wave and the third harmonic wave emitted from the third harmonic wave forming optical element;
a 'second' second harmonic wave forming optical element which forms a 'second' second harmonic wave from a 'second' fundamental wave;
a first optical member which combines a third fundamental wave and the 'second' second harmonic wave emitted from the 'second' second harmonic wave forming optical element on the same optical path;
a second optical member which combines the third fundamental wave, the 'second' second harmonic wave emitted from the 'second' second harmonic wave forming optical element, and the fifth harmonic wave emitted from the fifth harmonic wave forming optical element on the same optical path;
a seventh harmonic wave forming optical element which forms a seventh harmonic wave from the 'second' second harmonic wave and the fifth harmonic wave; and
an eighth harmonic wave forming optical element which forms an eighth harmonic wave from the third fundamental wave and the seventh harmonic wave emitted from the seventh harmonic wave forming optical element.

3. The wavelength converting optical system according to claim 1, wherein the conversion efficiency from the second fundamental wave to the second 'second' harmonic wave in the second 'second' harmonic wave forming optical element is 60% or greater.

4. The wavelength converting optical system according to claim 1, wherein the pulse width of the first fundamental wave through third fundamental wave is 50 ps or less.

5. The wavelength converting optical system according to claim 1, wherein there is no optical system between the seventh harmonic wave forming optical element and the eighth harmonic wave forming optical element.

6. A laser light source comprising:
at least one laser light source generating the first fundamental wave through the third fundamental wave;
a plurality of optical fiber amplifiers which respectively amplify the first fundamental wave through third fundamental wave; and
the wavelength converting optical system according to claim 1.

7. A laser light source according to claim 6 further comprising:
a plurality of delay devices which control the timing at which at least two fundamental waves among the first fundamental wave through third fundamental wave are incident on the respective optical fiber amplifiers.

8. An exposure apparatus which is constructed so that this exposure apparatus comprises:
the laser light source according to claim 6;
a mask supporting part which holds a photo-mask on which a specified exposure pattern is formed;
an object holding part which holds the object of exposure;
an illumination optical system which illuminates the photo-mask held by the mask supporting part with ultraviolet light emitted from the laser light source; and
a projection optical system which illuminates the object of exposure held by the object holding part with illuminating light that is caused to illuminate the photo-mask via the illumination optical system and that passes through this photo-mask.

9. A device for inspecting an object of inspection, comprising:
the laser light source according to claim 6;
a supporting part which holds the object of inspection;
a detector which detects a projected image of the object of inspection;
an illumination optical system which illuminates the object of inspection held by the supporting part with ultraviolet light emitted from the laser light source; and
a projection optical system which projects onto the detector illuminating light that has been caused to illuminate the object of inspection via the illumination optical system and that has passed through this object of inspection.

10. A polymer crystal working apparatus for working polymer crystals, comprising:
the laser light source according to claim 6;

an optical system which conducts laser light emitted from this laser light source to a polymer crystal that constitutes the object of working, and focuses this light on the portion of this polymer crystal that is being worked; and a mechanism which varies the relative positions of the optical system and the polymer crystal.

11. The wavelength converting optical system according to claim 2, wherein the conversion efficiency from the second fundamental wave to the second 'second' harmonic wave in the second 'second' harmonic wave forming optical element is 60% or greater.

12. The wavelength converting optical system according to claim 2, wherein the pulse width of the first fundamental wave through third fundamental wave is 50 ps or less.

13. The wavelength converting optical system according to claim 2, wherein there is no optical system between the seventh harmonic wave forming optical element and the eighth harmonic wave forming optical element.

14. A laser light source comprising:

at least one laser light source generating the first fundamental wave through the third fundamental wave;

a plurality of optical fiber amplifiers which respectively amplify the first fundamental wave through third fundamental wave; and the wavelength converting optical system according to claim 2.

* * * * *